United States Patent
Lee

(10) Patent No.: US 11,611,716 B2
(45) Date of Patent: Mar. 21, 2023

(54) IMAGE SENSING DEVICE

(71) Applicant: SK hynix Inc., Icheon-si (KR)

(72) Inventor: Eun Khwang Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/554,355

(22) Filed: Dec. 17, 2021

(65) Prior Publication Data
US 2022/0295003 A1 Sep. 15, 2022

(30) Foreign Application Priority Data

Mar. 11, 2021 (KR) .................. 10-2021-0032160

(51) Int. Cl.
*H04N 5/357* (2011.01)
*H04N 17/00* (2006.01)
*H04N 5/369* (2011.01)
*H01F 7/20* (2006.01)

(52) U.S. Cl.
CPC ............ *H04N 5/3577* (2013.01); *H01F 7/20* (2013.01); *H04N 5/379* (2018.08); *H04N 17/002* (2013.01)

(58) Field of Classification Search
CPC .... H04N 5/3577; H04N 5/379; H04N 17/002; H01F 7/20
See application file for complete search history.

(56) References Cited

U.S. PATENT DOCUMENTS

| 8,928,128 B2 | 1/2015 | Karikalan et al. |
| 8,933,544 B2 | 1/2015 | Mao et al. |
| 9,634,158 B2 | 4/2017 | Kobayashi et al. |
| 2018/0114807 A1* | 4/2018 | Yamagishi .......... H01L 23/5286 |
| 2021/0190832 A1* | 6/2021 | Liu ..................... G01R 15/202 |

FOREIGN PATENT DOCUMENTS

| KR | 20110136627 A | 12/2011 |
| WO | 2020054414 A1 | 3/2020 |

* cited by examiner

*Primary Examiner* — Michael E Teitelbaum
(74) *Attorney, Agent, or Firm* — Perkins Coie LLP

(57) ABSTRACT

An image sensing device includes a first substrate configured to include a plurality of unit pixels configured to detect incident light to produce pixel signals carrying image information in the incident light, a second substrate positioned adjacent to the first substrate and including a structure that generates a first magnetic field at the first substrate affecting the plurality of unit pixels and at least one shielding device disposed between the first substrate and the second substrate, wherein the shielding device includes a sensing circuit configured to detect a first voltage corresponding to the first magnetic field and an offset circuit configured to generate, based on the first voltage, a second magnetic field that counteracts the first magnetic field.

14 Claims, 8 Drawing Sheets

IMAGE SENSING DEVICE

CROSS-REFERENCE TO RELATED APPLICATION

This patent document claims the priority and benefits of Korean patent application No. 10-2021-0032160, filed on Mar. 11, 2021, the disclosure of which is incorporated by reference in its entirety as part of the disclosure of this patent document.

TECHNICAL FIELD

The technology and implementations disclosed in this patent document generally relate to an image sensing device that includes a device structured to shield magnetic fields.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various devices such as smart phones, digital cameras, game machines, IOT (Internet of Things), robots, security cameras and medical micro cameras.

The image sensing device may be roughly divided into CCD (Charge Coupled Device) image sensing devices and CMOS (Complementary Metal Oxide Semiconductor) image sensing devices. The CCD image sensing devices offer a better image quality, but they tend to consume more power and are larger as compared to the CMOS image sensing devices. The CMOS image sensing devices are smaller in size and consume less power than the CCD image sensing devices. Furthermore, CMOS sensors are fabricated using the CMOS fabrication technology, and thus photosensitive elements and other signal processing circuitry can be integrated into a single chip, enabling the production of miniaturized image sensing devices at a lower cost. For these reasons, CMOS image sensing devices are being developed for many applications including mobile devices.

SUMMARY

Various embodiments of the disclosed technology relate to an image sensing device structured to offset magnetic fields generated in the substrate, thereby reducing noise that stems from the magnetic fields.

In an embodiment of the disclosed technology, an image sensing device may include a first substrate configured to include a plurality of unit pixels configured to detect incident light to produce pixel signals carrying image information in the incident light, a second substrate positioned adjacent to the first substrate and including a structure that generates a first magnetic field at the first substrate affecting the plurality of unit pixels and at least one shielding device disposed between the first substrate and the second substrate, wherein the shielding device includes a sensing circuit configured to detect a first voltage corresponding to the first magnetic field and an offset circuit configured to generate, based on the first voltage, a second magnetic field that counteracts the first magnetic field.

In some implementations, the sensing circuit may include a current generator configured to generate a first current and a voltage detector configured to detect the first voltage generated by the first current and the first magnetic field, wherein the first voltage includes a Hall effect voltage generated by the first magnetic field provided in a direction perpendicular to the first current.

In some implementations, a first current that flows in the current generator in parallel but opposite in direction to another first current that flows in another adjacent current generator located within a predetermined distance.

In some implementations, the offset circuit includes an amplification circuit configured to receive the first voltage from the sensing circuit, and generate a second voltage by amplifying the first voltage.

In some implementations, the offset circuit includes a magnetic field generator configured to include a conductor plate, wherein the second magnetic field is induced when the second voltage is provided to the magnetic field generator.

In some implementations, the image sensing device may further include a shielding controller configured to provide a test voltage to the offset circuit during a test mode operation for calculating a second voltage corresponding to the first voltage such that the second voltage is associated with the second magnetic field that counteracts the first magnetic field, wherein the offset circuit includes a magnetic field generator configured to include a conductor plate for generating a test magnetic field using the test voltage provided to the magnetic field generator.

In some implementations, the sensing circuit is configured to detect a third voltage corresponding to a third magnetic field formed after generation of the test magnetic field and the shielding controller is configured to set the test voltage as the second voltage in a case that the third voltage has a predetermined voltage range and map the first voltage to the second voltage to store mapping information between the first voltage and the second voltage.

In some implementations, during a normal mode operation for offsetting the first magnetic field, the sensing circuit is configured to transmit the first voltage to the offset circuit and the offset circuit includes an amplification circuit configured to, upon receiving the first voltage, amplify the first voltage to the second voltage based on mapping information between the first voltage and the second voltage stored in the shielding controller and a magnetic field generator configured to include a conductor plate, wherein the second magnetic field is induced when the second voltage is provided to the magnetic field generator.

In some implementations, the shielding device is arranged over a location of the second substrate, and wherein the location of the second substrate is determined based on a distance between the first substrate and the second substrate, a density of the first magnetic field per unit area, and where a logic circuit is located in the second substrate.

In accordance with an embodiment of the disclosed technology, an image sensing device may include a first substrate including electric circuits that generate electrons in the first substrate, a second substrate arranged adjacent to the first substrate and including a structure that generates a first magnetic field for providing a magnetic force to the electrons and a shielding device disposed between the first substrate and the second substrate and configured to detect the first magnetic field and generate, based on the detected first magnetic field, a second magnetic field for counteracting the first magnetic field.

In some implementations, the second magnetic field is identical in magnitude to the first magnetic field and is opposite in phase to the first magnetic field.

In some implementations, the shielding device may be configured to detect a first voltage in response to the first magnetic field applied at a predetermined angle with respect to the shielding device and amplify the first voltage to generate a second voltage for generating the second magnetic field.

In some implementations, the shielding device may include a magnetic field generation region structured to receive the second voltage and the second magnetic field is induced by the second voltage.

In some implementations, the image sensing device may further include a shielding controller configured to provide a test voltage to the shielding device during a test mode operation for calculating a second voltage corresponding to the first magnetic field such that the second voltage is associated with the second magnetic field that counteracts the first magnetic field, wherein the shielding device is configured to generate a test magnetic field corresponding to the test voltage.

In some implementations, the shielding device may be configured to detect a third magnetic field formed after generation of the test magnetic field and the shielding controller is configured to set the test voltage as the second voltage in a case that the third magnetic field reaches a predetermined value, and map the first magnetic field to the second voltage to store mapping information between the first magnetic field and the second voltage.

In some implementations, during a normal mode operation for offsetting the first magnetic field, the shielding device is configured to detect the first magnetic field and generate the second magnetic field based on the second voltage corresponding to the first magnetic field.

In another embodiment of the disclosed technology, an image sensing device may include a first substrate configured to include a plurality of unit pixels, a second substrate in which a first magnetic field affecting the plurality of unit pixels is generated, and at least one shielding device disposed between the first substrate and the second substrate. The shielding device may include a sensing circuit configured to detect a first voltage corresponding to the first magnetic field, and an offset circuit configured to generate a second magnetic field using the first voltage.

In another embodiment of the disclosed technology, an image sensing device may include a first substrate configured to include electrons, a second substrate in which a first magnetic field for providing a magnetic force to the electrons is generated, and a shielding device configured to detect the first magnetic field, and generate a second magnetic field using the detected first magnetic field, wherein the shielding device is disposed between the first substrate and the second substrate.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

This patent document provides implementations and examples of an image sensing device structured to shield a magnetic field present at image sensing pixels. The disclosed technology can be implemented in some embodiments to provide an image sensing device structured to offset one or more magnetic fields generated in the substrate, thereby reducing noise that stems from the magnetic fields. In some embodiments of the disclosed technology, the image sensing device may include a shielding device structured to shield image sensing pixels from magnetic fields, preventing noise from occurring in the imagine sensing and the resultant image data.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

Figure 1:
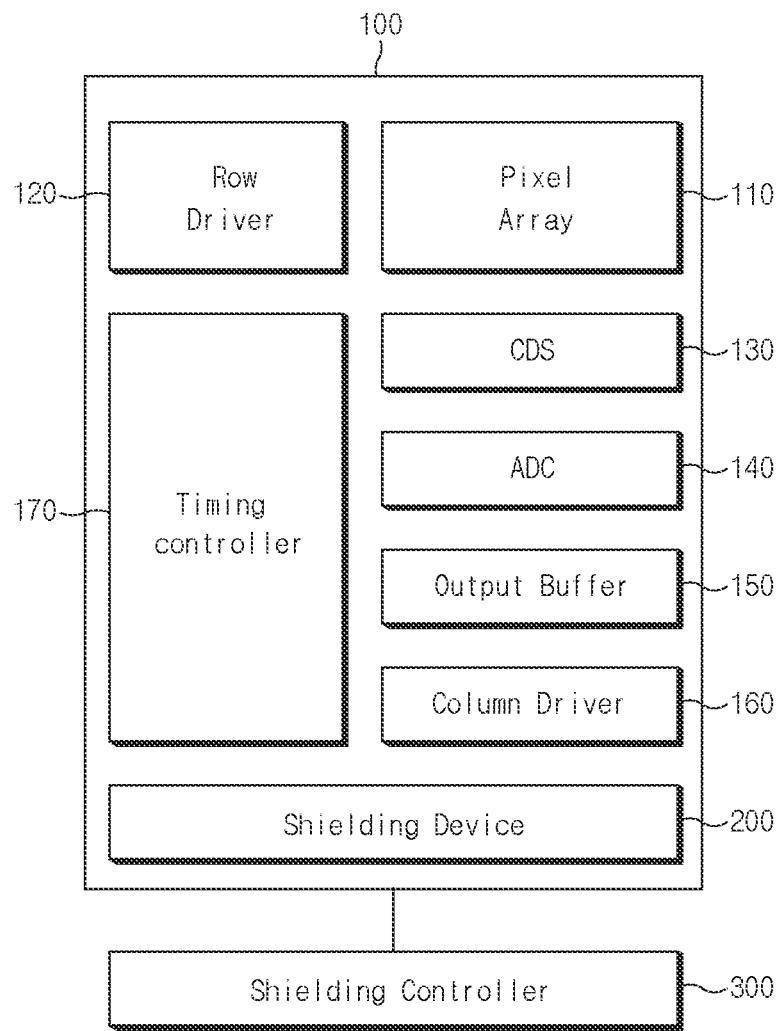
FIG. 1 is a block diagram illustrating an example of an image sensing device based on some implementations of the disclosed technology.

FIG. 1 is a block diagram illustrating an image sensing device 100 based on some implementations of the disclosed technology.

Referring to FIG. 1, the image sensing device 100 may include a pixel array 110, a row driver 120, a correlated double sampler (CDS) 130, an analog-digital converter (ADC) 140, an output buffer 150, a column driver 160 and a timing controller 170. In addition, the image sensing device 100 may be coupled to a shielding controller 300. The components of the image sensing device 100 illustrated in FIG. 1 are discussed by way of example only, and this patent document encompasses numerous other changes, substitutions, variations, alterations, and modifications.

The pixel array 110 may include a plurality of unit pixels arranged in rows and columns. Each unit pixel is structured to detect incident light to produce a pixel signal representing the detected incident light by that unit pixel and pixel signals from the unit pixels in the pixel array 110 carry image information in the incident light received by the pixel array 110. In one example, the plurality of unit pixels can be arranged in a two-dimensional (2D) pixel array including rows and columns. In another example, the plurality of unit pixels can be arranged in a three-dimensional (3D) pixel array. The plurality of unit pixels may convert an optical signal into an electrical signal on a unit pixel basis or a pixel group basis, where two or more unit pixels in a pixel group share at least certain internal circuitry. The pixel array 110 may receive driving signals, including a row selection signal, a pixel reset signal and a transmission signal, from the row driver 120. Upon receiving the driving signal, corresponding unit pixels in the pixel array 110 may be activated to perform the operations corresponding to the row selection signal, the pixel reset signal, and the transmission signal.

The row driver 120 may activate the pixel array 110 to perform certain operations on the unit pixels in the corresponding row based on commands and control signals provided by controller circuitry such as the timing controller 170. In some implementations, the row driver 120 may select one or more unit pixels arranged in one or more rows of the pixel array 110. The row driver 120 may generate a row selection signal to select one or more rows among the plurality of rows. The row driver 120 may sequentially enable the pixel reset signal for resetting imaging pixels corresponding to at least one selected row, and the transmission signal for the pixels corresponding to the at least one selected row. Thus, a reference signal and an image signal, which are analog signals generated by each of the imaging pixels of the selected row, may be sequentially transferred to the CDS 130. The reference signal may be an electrical signal that is provided to the CDS 130 when a sensing node of an imaging pixel (e.g., floating diffusion node) is reset, and the image signal may be an electrical signal that is provided to the CDS 130 when photocharges generated by the imaging pixel are accumulated in the sensing node. The reference signal indicating unique reset noise of each pixel and the image signal indicating the intensity of incident light may be generically called a pixel signal as necessary.

CMOS image sensors may use the correlated double sampling (CDS) to remove undesired offset values of pixels known as the fixed pattern noise by sampling a pixel signal twice to remove the difference between these two samples. In one example, the correlated double sampling (CDS) may remove the undesired offset value of pixels by comparing pixel output voltages obtained before and after photocharges generated by incident light are accumulated in the sensing node so that only pixel output voltages based on the incident light can be measured.

In some implementations of the disclosed technology, the CDS 130 may sequentially sample and hold voltage levels of the reference signal and the image signal, which are provided to each of a plurality of column lines from the pixel array 110. That is, the CDS 130 may sample and hold the voltage levels of the reference signal and the image signal which correspond to each of the columns of the pixel array 110.

In some implementations, the CDS 130 may transfer the reference signal and the image signal of each of the columns as a correlate double sampling signal to the ADC 140 based on control signals from the timing controller 170.

The ADC 140 is used to convert analog CDS signals into digital signals. In some implementations, the ADC 140 may be implemented as a ramp-compare type ADC. The ramp-compare type ADC may include a comparator circuit for comparing the analog pixel signal with a reference signal such as a ramp signal that ramps up or down, and a timer counts until a voltage of the ramp signal matches the analog pixel signal. In some embodiments of the disclosed technology, the ADC 140 may convert the correlate double sampling signal generated by the CDS 130 for each of the columns into a digital signal, and output the digital signal. The ADC 140 may perform a counting operation and a computing operation based on the correlate double sampling signal for each of the columns and a ramp signal provided from the timing controller 170. In this way, the ADC 140 may eliminate or reduce noises such as reset noise arising from the imaging pixels when generating digital image data.

The ADC 140 may include a plurality of column counters. Each column of the pixel array 110 is coupled to a column counter, and image data can be generated by converting the correlate double sampling signals received from each column into digital signals using the column counter. In another embodiment of the disclosed technology, the ADC 140 may include a global counter to convert the correlate double sampling signals corresponding to the columns into digital signals using a global code provided from the global counter.

The output buffer 150 may temporarily hold the column-based image data provided from the ADC 140 to output the image data. In one example, the image data provided to the output buffer 150 from the ADC 140 may be temporarily stored in the output buffer 150 based on control signals of the timing controller 170. The output buffer 150 may provide an interface to compensate for data rate differences or transmission rate differences between the image sensing device 100 and other devices.

The column driver 160 may select a column of the output buffer upon receiving a control signal from the timing controller 170, and sequentially output the image data, which are temporarily stored in the selected column of the output buffer 150. In some implementations, upon receiving an address signal from the timing controller 170, the column driver 160 may generate a column selection signal based on the address signal and select a column of the output buffer 150, outputting the image data as an output signal from the selected column of the output buffer 150.

The timing controller 170 may control operations of the row driver 120, the ADC 140, the output buffer 150, and the column driver 160.

The timing controller 170 may provide the row driver 120, the column driver 160, the ADC 140, and the output buffer 150 with a clock signal required for the operations of the respective components of the image sensing device 100, a control signal for timing control, and address signals for selecting a row or column. In an embodiment of the disclosed technology, the timing controller 170 may include a logic control circuit, a phase lock loop (PLL) circuit, a timing control circuit, a communication interface circuit and others.

In some implementations, the shielding device 200 may include a sensor for detecting the presence and/or magnitude of a magnetic field and a counter magnetic field that opposes or counteracts the detected magnetic field. In one example, the shielding device 200 may detect a first magnetic field generated by or induced in the image sensing apparatus 100. Upon detection of the first magnetic field, the shielding device 200 may generate a voltage that indicates the detected first magnetic field. For example, the shielding device 200 may generate a first voltage corresponding to a first magnetic field, and thus it can be determined that, based on the first voltage, the first magnetic field has been detected.

In addition, the shielding device 200 may generate a second magnetic field that is used to counteract the first magnetic field or reduce the effect of the first magnetic field. In this way, when generating image data output by the image sensing device 100, the shielding device 200 may reduce noise in the image data that would have caused by the first magnetic field by offsetting the effect of the first magnetic field using a second magnetic field that opposes or counteracts the first magnetic field.

In one implementation, the shielding controller 300 is disposed in the image sensing device 100. In another implementation, the shielding controller 300 is disposed outside the image sensing device 100. The shielding controller 300 may further include circuitry configured to provide a test voltage to the shielding device 200 during a test operation.

During the test operation, a computation is performed to obtain the magnitude and/or polarity of the second magnetic field for offsetting the effect of the first magnetic field. During the test operation, the shielding controller 300 provide a second voltage corresponding to the second magnetic field to the shielding device 200 to determine whether the second magnetic field can be used to offset the effect of the first magnetic field. The second voltage can be stored in correspondence with either the first magnetic field or the first voltage.

In some implementations, during the test operation, the shielding device 200 may generate a test magnetic field in response to a test voltage provided by the shielding controller 300. When the test magnetic field is applied, the shielding device 200 may detect a third magnetic field and calculate a test voltage for offsetting the first magnetic field based on the test magnetic field and the thirds magnetic field, which is induced by the test magnetic field. In some implementations, the shielding device 200 may apply a plurality of test voltages to determine which one of the test voltages allows the third voltage detected in response to the third magnetic field to be less than a predetermined voltage, and in a case that a third magnetic field is less than a predetermined voltage, the corresponding test voltage may be selected as the second voltage.

Figure 2:
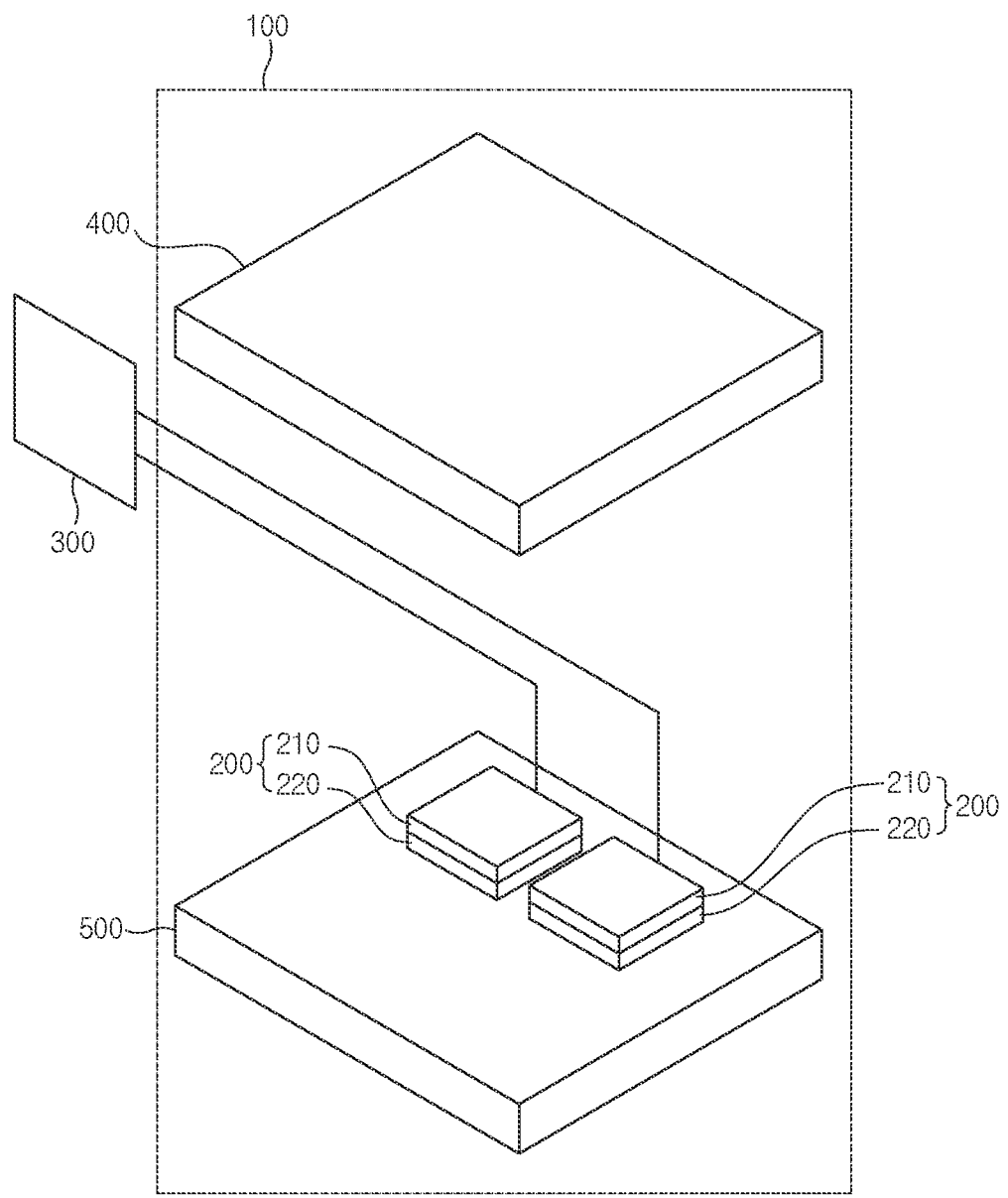
FIG. 2 is a schematic diagram illustrating an example of an image sensing device and a shielding controller based on some implementations of the disclosed technology.

FIG. 2 is a schematic diagram illustrating an example of the image sensing device 100 and the shielding controller 300 based on some implementations of the disclosed technology.

Referring to FIG. 2, the image sensing device 100 may include a first substrate 400 including a plurality of unit pixels, a second substrate 500 including a plurality of logic circuits, and at least one shielding device 200 disposed between the first substrate 400 and the second substrate 500.

The shielding device 200 may be coupled to the shielding controller 300 disposed outside the image sensing device 100.

The first substrate 400 may include the pixel array 110 (see FIG. 1). As illustrated in FIG. 1, the pixel array 110 may include a plurality of unit pixels arranged in a two-dimensional (2D) matrix array. In addition, the plurality of unit pixels may be arranged in row and column directions in the first substrate 400.

For example, the first substrate 400 may be a monocrystalline silicon substrate. The first substrate 400 may be a P-type or N-type bulk substrate, may be a substrate formed by growing a P-type or N-type epitaxial layer on the P-type bulk substrate, or may be a substrate formed by growing a P-type or N-type epitaxial layer on the N-type bulk substrate.

Each of the unit pixels may include a microlens, a photoelectric conversion region, and a transistor region.

The microlens may allow light incident upon the unit pixel to be directed (or guided) to the photoelectric conversion region.

The photoelectric conversion regions may be disposed in the unit pixels, respectively. That is, each photoelectric conversion region may be disposed for each unit pixel. For example, each photoelectric conversion region may be implemented as a photodiode, a phototransistor, a photogate, a pinned photodiode (PPD), or a combination thereof. For convenience of description, it is assumed that each photoelectric conversion region is implemented as a photodiode as an example.

The photoelectric conversion region may be formed as an N-type doped region through ion implantation of N-type ions. In some implementations, the photoelectric conversion region may include a stacked structure in which a plurality of doped regions is vertically stacked.

The photoelectric conversion region may be arranged across as large a region as possible to increase light reception (Rx) efficiency of the unit pixel. The photoelectric conversion region may generate electrons corresponding to incident light.

The transistor region may include a reset transistor, a transfer transistor, a floating diffusion (FD) region, a drive transistor, a selection transistor, signal lines connected to the above-mentioned transistors, and the like.

The reset transistor may be activated in response to a reset signal, such that the reset transistor may reset the potential of each unit pixel to a predetermined voltage level (e.g., a pixel voltage level).

In addition, when the reset transistor is activated, the transfer transistor may also be activated to reset the floating diffusion (FD) region. In the active state of such transistor, an activation signal may be input to the respective transistors so that a channel may be formed between a source electrode and a drain electrode of the transistor.

When the transfer transistor is activated, the transfer transistor may transmit photocharges accumulated in the photoelectric conversion region to the floating diffusion (FD) region.

The drive transistor may receive a pixel voltage through a drain terminal thereof, and may be coupled to the floating diffusion (FD) region through a gate terminal thereof. In addition, the selection transistor may be coupled to a source electrode of the drive transistor. Therefore, the drive transistor may output a current corresponding to an electrical potential of the floating diffusion (FD) region coupled to a gate electrode thereof to a signal line through the selection transistor.

The selection transistor may be activated in response to a selection signal applied to a gate electrode thereof, such that the selection transistor may transmit an output signal of the drive transistor to a signal line.

The reset signal, the transmission signal, and the selection signal may be received from the row driver 120 (see FIG. 1).

Each signal that is transferred from the transistor region to the signal line may be converted into an image signal through analog-to-digital conversion (ADC) processing.

In some implementations, the transistor region may be disposed below the photoelectric conversion region. In some other implementations, the transistor region may be disposed between the adjacent unit pixels. The transistor region is disposed below the photoelectric conversion region or is disposed between the adjacent unit pixels, resulting in guarantee of a light reception (Rx) region of the photoelectric conversion region.

The second substrate 500 may include a logic region and a conductor region. The logic region may include the row driver 120 of FIG. 1, the CDS 130 of FIG. 1, the ADC 140 of FIG. 1, the output buffer 150 of FIG. 1, the column driver 160 of FIG. 1, and the timing controller 170 of FIG. 1.

The conductor region may refer to a region in which conductors such as metal lines are densely arranged (or concentrated). The conductor region may vary in position depending on a layout structure of the image sensing device 100. For example, a specific region in which signal lines connected to the unit pixels are concentrated may be used as the conductor region.

An induced magnetic field may be generated by a current flowing in either the conductor region or the logic region. The induced magnetic field may be used as the first magnetic field.

Although FIG. 2 illustrates the image sensing device 100 including the first substrate 400 and the second substrate 500 for convenience of description, the scope or spirit of the disclosed technology is not limited thereto, and the image sensing device 100 may include not only the first and second substrates 400 and 500, but also a plurality of other substrates as needed.

For example, the image sensing device including a third substrate formed below the second substrate 500 may be configured in a manner that the conductor region or the logic region may be disposed in the third substrate.

When the conductor region or the logic region is disposed in the third substrate, a separation distance between a region where the first magnetic field is formed and the first substrate 400 may become longer. In addition, the second substrate 500 disposed between the first substrate 400 and the third substrate may shield the first magnetic field. In other words, when the conductor region or the logic region is disposed in the third substrate, the first substrate 400 may be less affected by the first magnetic field.

The first magnetic field may provide a magnetic force to electrons included in the first substrate 400. The electrons having received the magnetic force may affect signals generated by the first substrate 400.

In some implementations, the shielding device 200 may be disposed between the first substrate 400 and the second substrate 500, and may overlap with the logic or conductor region included in the second substrate 500. The shielding device 200 may vary in arrangement position depending on a generation position of the first magnetic field, the amount of the first magnetic field generated per unit region, and the shape of the second substrate.

For example, in the case where the distance between the first substrate 400 and the first magnetic field generation region is longer than a predetermined distance, the first substrate 400 may be less affected by the first magnetic field as compared to the other case in which the distance between the first substrate 400 and the first magnetic field generation region is equal to or shorter than the predetermined distance.

Therefore, the shielding device 200 may be disposed only in a specific region where the distance between the first substrate 400 and the first magnetic field generation region (e.g., the conductor region or the logic region) is shorter than the predetermined distance, resulting in reduction in power consumption caused by the shielding device 200. The predetermined distance may be determined experimentally.

The shielding device 200 may include a sensing circuit 210 for detecting the first magnetic field, and an offset circuit 220 for generating the second magnetic field. The offset circuit 220 may receive a first voltage corresponding to the first magnetic field from the sensing circuit 210. In some implementations, the offset circuit 220 may include circuitry that can generate a counter magnetic field that opposes or counteracts the first magnetic field.

The sensing circuit 210 may detect the first magnetic field generated by the current flowing in the second substrate 500. In some implementations, the sensing circuit 210 may generate a plurality of voltages each of which is mapped to a magnetic field to indicate that the corresponding magnetic field is induced in the second substrate 500. In one example, the sensing circuit 210 may generate a first voltage corresponding to the first magnetic field, and upon detection of the first voltage, it can be determined that the first magnetic field is present. The intensity of the first voltage may be proportional to the intensity of the first magnetic field, and a positive first voltage and a negative first voltage may indicate the first magnetic fields with opposite polarities (e.g., first magnetic field flows into the sensing unit 210 in opposite directions).

In some implementations, the sensing circuit 210 may include a Hall effect sensor. The Hall effect sensor may detect the presence and magnitude of a magnetic field using the Hall Effect. For instance, the Hall effect sensor may detect a magnetic field provided to the Hall effect sensor by detecting a Hall effect voltage generated by a change in current flowing into the Hall effect sensor. The change in current flowing into the sensor may be caused by the magnetic field provided to the Hall effect sensor.

In some implementations, the sensing circuit 210 may detect the first magnetic field based on a first current flowing in the sensing circuit. For instance, the first current may flow in a certain direction in the sensing circuit 210. When the first magnetic field is detected by the sensing circuit 210, there may be a change in the flow of the first current, and thus the sensing circuit 210 may detect a Hall effect voltage generated by the change in the first current.

In some implementations, the sensing circuit 210 may detect a Hall effect voltage corresponding to the first magnetic field provided in the direction perpendicular to the first current flowing through the sensing circuit 210. The sensing circuit 210 may be disposed parallel to the second substrate 500 in a manner that the first magnetic field provided in the direction perpendicular to the first current is maximized. The sensing circuit 210 may be disposed parallel to the second substrate 500, increasing sensitivity to the first magnetic field of the sensing circuit 210. The Hall effect voltage generated in response to the first magnetic field may be referred to as a first voltage. The sensing circuit 210 may transmit the detected first voltage to the offset circuit 220.

The offset circuit 220 may generate a second magnetic field using the first voltage. The offset circuit 220 may generate the second voltage by amplifying the first voltage, and may generate the second magnetic field corresponding to the second voltage. The second magnetic field may have the magnitude and/or polarity that can offset the effect of the first magnetic field, thereby reducing/minimizing noise generated by the first magnetic field.

In some implementations, the second magnetic field generated by the offset circuit 220 may be opposite in phase to the first magnetic field, and the magnitude of the second magnetic field may be identical to the magnitude of the first magnetic field. The offset circuit 220 may include a conductor plate in which a second current flows based on the second voltage, and the second magnetic field may be an induced magnetic field generated by the second current.

The magnitude and sign of the second voltage provided to the offset circuit 220 may vary depending on the magnitude and phase of the first magnetic field provided to the sensing circuit 210. The ratio at which the first voltage is amplified to the second voltage by the offset circuit 220 may be determined through the test mode.

In some implementations, the sensing circuit 210 may be arranged closer to the first substrate 400 than the offset circuit 220, and the offset circuit 220 may be arranged closer to the second substrate 500 than the sensing circuit 210.

The sensing circuit 210 may be arranged closer to the first substrate 400 than to the second substrate 500. As such, the sensing circuit 210 may sense a magnetic field having a value (e.g., magnitude, polarity) closest to a magnetic field that is affecting the first substrate 400. During the test mode, the shielding controller 300 may provide a test voltage to the offset circuit 220, and may store the second voltage for offsetting the effect of the first magnetic field in a manner that the second voltage can correspond to either the first voltage or the first magnetic field.

The shielding controller 300 may provide a test voltage to the offset circuit 220, for example, during a test operation. The shielding controller 300 may store the second voltage for offsetting the first magnetic field based on the second voltage that is stored, for example, in a mapping table. In the mapping table, the second voltage may be mapped to either the first voltage or the first magnetic field. The sensing circuit 210 may transmit a voltage corresponding to the magnetic field detected by the sensing circuit 210 to the shielding controller 300.

In some implementations, the first current flowing in one of the shielding devices 200 (e.g., one of the two shielding devices as shown in FIG. 2) located within the range of a predetermined distance may be parallel to the other first current flowing in another shielding device 200 (e.g., the other one of the two shielding devices as shown in FIG. 2). In addition, the first currents respectively flowing in those two shielding devices 200 may be opposite in direction to each other.

In this case, the predetermined distance may be set to a distance at which the induced magnetic fields generated by the sensing circuits 210 in the shielding devices 200 can counteract against each other. In other words, the sensing circuits 210 may be disposed in a manner that a first induced magnetic field generated by a first current flowing in one sensing circuit 210 and a second induced magnetic field generated by a first current flowing in the other sensing circuit 210 can counteract against each other.

The shielding controller 300 may be coupled to the plurality of shielding devices 200. The shielding controller 300 may include a memory and a processor for controlling the plurality of shielding devices 200.

The shielding controller 300 may receive the first voltage detected by the shielding device 200. In addition, the shielding controller 300 may transmit a test voltage to any of the shielding devices 200 during the test mode operation. Each shielding device 200 may generate a test magnetic field based on the received test voltage. When the test magnetic field is applied, each shielding device 200 may detect a third magnetic field upon detecting the third voltage corresponding to the third magnetic field. The shielding device 200 may detect the third magnetic field by detecting the third voltage.

The shielding controller 300 may store information associated with test voltages where the corresponding third voltages have voltages within a predetermined voltage range and map those test voltages to first voltages detected by each of the shielding devices 200. The test voltages corresponding to the first voltages can be stored in the memory for each shielding device 200. In some implementations, the memory may store a mapping table that maps the test voltages to the corresponding first voltages detected by the respective shielding devices 200.

A processor included in the shielding controller 300 may determine whether to provide the test voltage to the shielding device 200 according to operation modes. In addition, during the test mode operation, the processor may determine the magnitude of the test voltage to be provided to each of the shielding devices 200.

Figure 3:
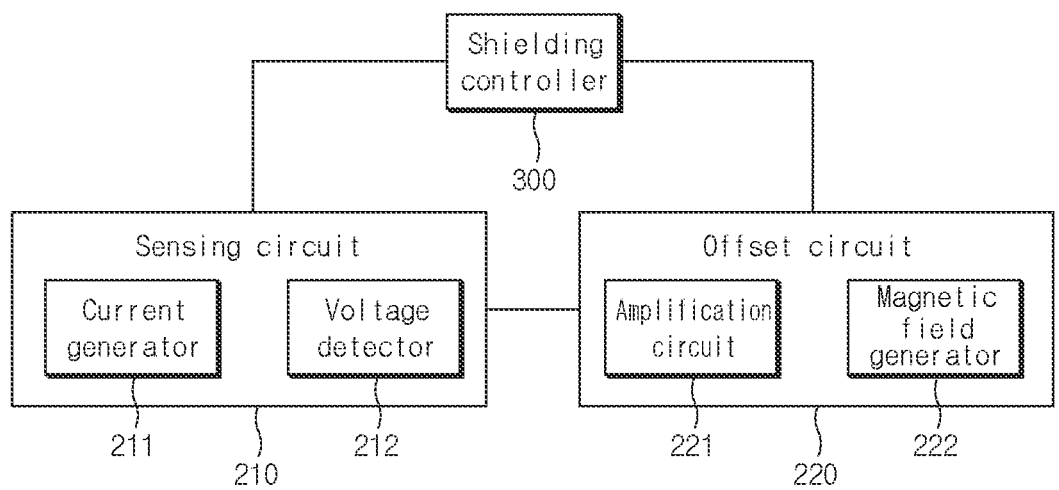
FIG. 3 is a block diagram illustrating an example of a shielding device and a shielding controller based on some implementations of the disclosed technology.

FIG. 3 is a block diagram illustrating an example of the shielding device 200 and the shielding controller 300 based on some implementations of the disclosed technology.

Referring to FIG. 3, the shielding device 200 may include the sensing circuit 210 for sensing a magnetic field and the offset circuit 220 for producing a counter magnetic field to counter the sensed magnetic field to reduce the net magnetic field of the imaging device. The sensing circuit 210 may include a current generator 211 and a voltage detector 212. The offset circuit 220 may include an amplification circuit 221 and a magnetic field generator 222.

In some implementations, the shielding device 200 may be included in the image sensing device 100. The shielding controller 300 may be located outside the image sensing device 100.

In the current generator 211, a current source may generate a first current that has a predetermined magnitude and direction. In this case, the first current may flow parallel to one surface of the second substrate 500. The sensing circuit 210 may detect a Hall effect voltage corresponding to a magnetic field generated perpendicular to the second substrate 500 from among the first magnetic fields generated by the second substrate 500.

The voltage detector 212 may be coupled to the current generator 211 so that the voltage detector 212 can detect the first voltage corresponding to the first magnetic field. In some implementations, the first voltage may include a Hall effect voltage that is generated in the current generator 211 by the current generator 211. For example, the voltage detector 212 may be a voltmeter for detecting a voltage difference between one direction of the first current and the other direction perpendicular to the first current direction.

The sensing circuit 210 may transmit the detected first voltage to the offset circuit 220.

The offset circuit 220 may include the amplification circuit 221 for amplifying the received first voltage. In this case, the first voltage may be amplified to the second voltage by the amplification circuit 221.

In one embodiment of the disclosed technology, the amplification circuit 221 may include an operational amplifier (OP-AMP). In some implementations, the amplification circuit 221 can include any circuitry that can amplify the voltage.

The amplification circuit 221 may receive and amplify the first voltage detected by the sensing circuit 210 in real time, and may generate a second voltage based on the amplified first voltage. In this case, the amplification ratio of the first voltage may be determined through the test mode operation.

The magnetic field generator 222 may receive the second voltage from the amplification circuit 221 to generate a second magnetic field based on the second voltage. In some implementations, since the second voltage is provided to the magnetic field generator 222, a second current corresponding to the second voltage may flow in the magnetic field generator 222.

The second magnetic field may be generated by the second current flowing in the magnetic field generator 222. The second magnetic field may be an induced magnetic field generated by the second current. The offset circuit 220 may adjust the second voltage provided to the magnetic field generator 222, and thus can adjust the second magnetic field.

The shielding controller 300 may be coupled to each of the shielding devices 200. The shielding controller 300 may include a processor and a memory to control each of the shielding devices 200. The shielding controller 300 may control the plurality of shielding devices 200 using the processor and the memory.

During the test mode operation, the shielding controller 300 may receive the first voltage from the sensing circuit 210. In addition, the shielding controller 300 may provide a test voltage to the offset circuit 220. A test current corresponding to the test voltage may flow in the magnetic field generator 222 included in the offset circuit 220.

The magnetic field generator 222 may generate an induced magnetic field corresponding to the test current, and the induced magnetic field generated by the test current may be referred to as a test magnetic field.

The sensing circuit 210 may detect a third voltage corresponding to a third magnetic field that is formed due to the test magnetic field. The sensing circuit 210 may transmit the detected third voltage to the shielding controller 300.

The shielding controller 300 may repeat the operations discussed above to determine the test voltage provided to the offset circuit 220 based on the third voltage. The shielding controller 300 may adjust the test voltage provided to the offset circuit 200 until the third voltage reaches a predetermined voltage.

If the effect of the first magnetic field is completely offset by the test magnetic field, the third voltage may be at or near zero volts (0V). Therefore, as the predetermined voltage moves closer to zero volts (0V), the first magnetic field shielding effect that opposes or counteracts the first magnetic field by the shielding device 200 may increase.

The shielding controller 300 may use the test voltage as a second voltage (a counter magnetic field that opposes or counteracts) where the third voltage has a predetermined voltage range. In addition, the shielding controller 300 may store the first voltage and the second voltage and/or mapping information between the first voltage and the second voltage in the memory.

In some implementations, the shielding controller 300 may include a processor that can set the test voltages to be provided to the shielding devices 200 connected to the shielding controller 300. In one example, the processor in the shielding controller 300 may set one or more test voltages for each shielding device 200. In one example, different test voltages may be provided to different shielding devices 200. As such, the first magnetic field detected by each of the shielding devices 200 can be offset by using a corresponding counter magnetic field.

During a normal mode operation, the shielding device 200 may detect a first voltage through the sensing circuit 210. The offset circuit 220 may receive the first voltage, and the amplification circuit 221 may amplify the received first voltage to a second voltage stored in the shielding controller 300.

Figure 4:
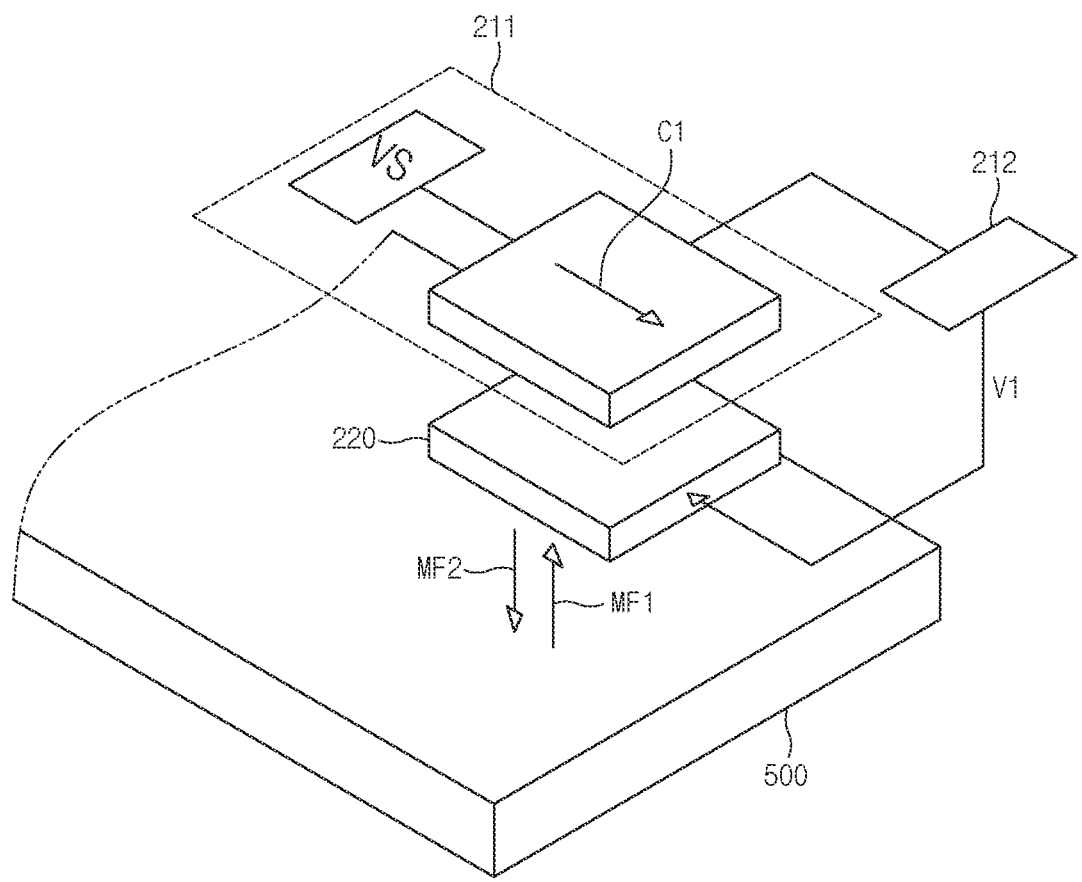
FIG. 4 is a schematic diagram illustrating an example of a shielding device and a second substrate based on some implementations of the disclosed technology.

FIG. 4 is a schematic diagram illustrating an example of the shielding device 200 and the second substrate 500 based on some implementations of the disclosed technology.

In more detail, FIG. 4 illustrates one shielding device 200 and a portion of the second substrate 500.

The shielding device 200 may overlap with the portion of the second substrate 500. In this case, the portion where the shielding device 200 overlaps with the second substrate 500 may be a region in which the first magnetic field is generated. The shielding device 200 may include a current generator 211, a voltage detector 212, and an offset circuit 220.

The current generator 211 may be disposed parallel to the second substrate 500 to easily detect a first magnetic field MF1 arranged perpendicular to one plane of the current generator 211.

The first current C1 may have a predetermined magnitude and direction in the current generator 211. The first current C1 may be generated by a voltage source (VS). In addition, the first current C1 may flow parallel to one surface of the second substrate 500. In some implementations, the current generator 211 may include a conductor plate, and the voltage source (VS) may be a DC voltage source provided to the conductor plate.

The voltage detector 212 may detect a voltage between both ends arranged perpendicular to the direction of the first current C1 flowing in the voltage generator 211. In some implementations, the voltage detector 212 may be a voltmeter.

The voltage detected by the voltage detector 212 may include a first voltage V1 corresponding to the first magnetic field MF1. The sensing circuit 210 may transmit the first voltage V1 detected by the voltage detector 212 to the offset circuit 220.

The offset circuit 220 may amplify the received first voltage V1 to a second voltage. The offset circuit 220 may generate a second magnetic field MF2 based on the second voltage. Since the second voltage is provided to the offset circuit 220, a second current may flow in the offset circuit 220. The second magnetic field MF2 may be an induced magnetic field generated by the second current. The second magnetic field MF2 may be opposite in phase to the first magnetic field MF1, such that the second magnetic field MF2 can be offset from the first magnetic field MF1. Since the second magnetic field MF2 opposes or counteracts the first magnetic field MF1, the effect of the first magnetic field MF1 on the first substrate 400 can be minimized.

Figure 5:
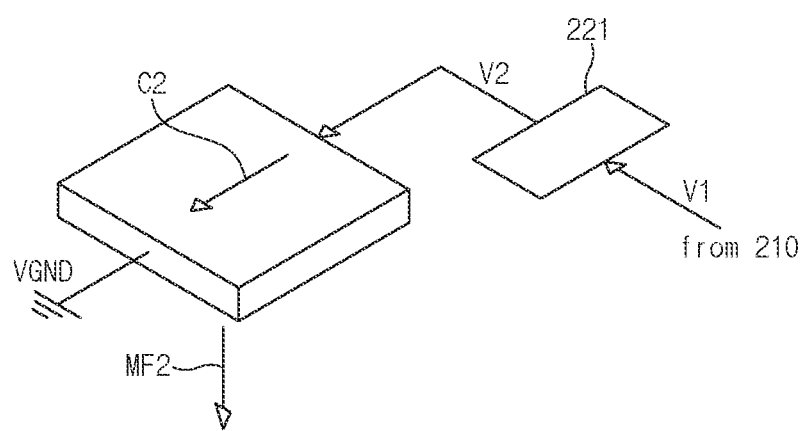
FIG. 5 is a schematic diagram illustrating an example of an offset circuit based on some implementations of the disclosed technology.

FIG. 5 is a schematic diagram illustrating an example of the offset circuit 220 based on some implementations of the disclosed technology.

Referring to FIG. 5, the offset circuit 220 may receive a first voltage V1 from the sensing circuit 210. The offset circuit 220 may include an amplification circuit 221 for amplifying the first voltage V1 to a second voltage V2, and a magnetic field generator 222 for generating a second magnetic field MF2 upon receiving the second voltage V2.

In some implementations, the amplification circuit 221 may include an operational amplifier (OP-AMP). In other implementations, the amplification circuit 221 can include any circuitry that can amplify the first voltage V1 to the second voltage V2.

In some implementations, the magnetic field generator 222 may include a conductor plate in which a second current C2 corresponding to the second voltage V2 flows. For example, the conductor plate may include metal. The conductor plate may be disposed parallel to one surface of the second substrate 500. The second voltage V2 may be provided to one end of the conductor plate, and the other end opposite to the one end receiving the second voltage V2 may be grounded (VGND, for example, 0V).

The second magnetic field MF2 may be an induced magnetic field generated by the second current C2 flowing in the magnetic field generator 222. Therefore, the magnitude and direction of the second magnetic field MF2 may be determined depending on the magnitude and direction of the second current C2 flowing in the magnetic field generator 222. The magnitude and direction of the second current C2 may be determined by the second voltage V2 provided to the magnetic field generator 220.

Figure 6:
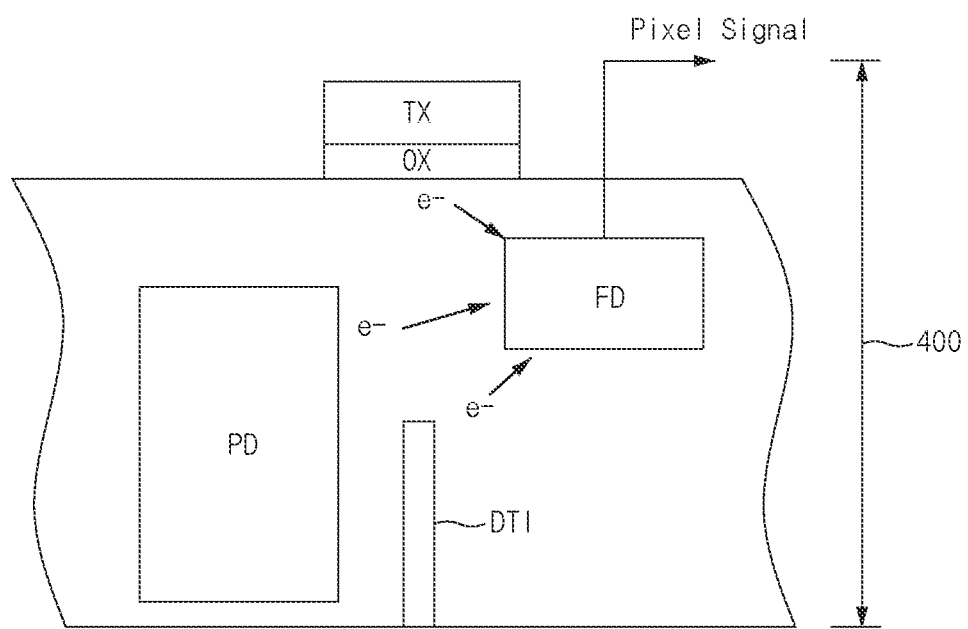
FIG. 6 is a conceptual diagram illustrating an example of noise generated by a first magnetic field in a first substrate based on some implementations of the disclosed technology.

FIG. 6 is a conceptual diagram illustrating an example of noise generated by a first magnetic field in the first substrate 400 based on some implementations of the disclosed technology.

As can be seen from FIG. 6, a transfer transistor (TX), a photoelectric conversion region (PD), a floating diffusion (FD) region, and a deep trench isolation (DTI) region (hereinafter referred to as a DTI region) may be formed in the first substrate 400.

When an activation signal is provided to the transfer transistor (TX), electrons generated in the photoelectric conversion region (PD) may be transmitted to the floating diffusion (FD) region. The electrons transmitted to the floating diffusion (FD) region may be read out as a pixel signal.

The first magnetic field may provide a magnetic force to electrons included in the first substrate 400. For example, the first magnetic field may provide a magnetic force to: electrons located at a boundary between the photoelectric conversion region (PD) and the first substrate 400; electrons located at a boundary between the DTI region and the first substrate 400; and electrons located at a boundary between the transfer transistor (TX) and the first substrate 400. The electrons may move to the floating diffusion (FD) region based on a potential distribution in the first substrate 400.

In other words, even when the activation signal is not applied to the transfer transistor (TX), electrons may move to the floating diffusion (FD) region by the first magnetic field. In addition, the first magnetic field may force more electrons to flow to the floating diffusion (FD) region than incident light that is converted into electrons in the photoelectric conversion region (PD).

Electrons generated in the first substrate 400 by the first magnetic field may affect the pixel signal, causing noise in an image that is generated based on the pixel signal. However, the second magnetic field generated based on some embodiments of the disclosed technology can be used to offset the effect of the first magnetic field by reducing or minimizing the negative effect on the pixel signal by the electrons moving in the first substrate 400 due to the first magnetic field.

Figure 7:
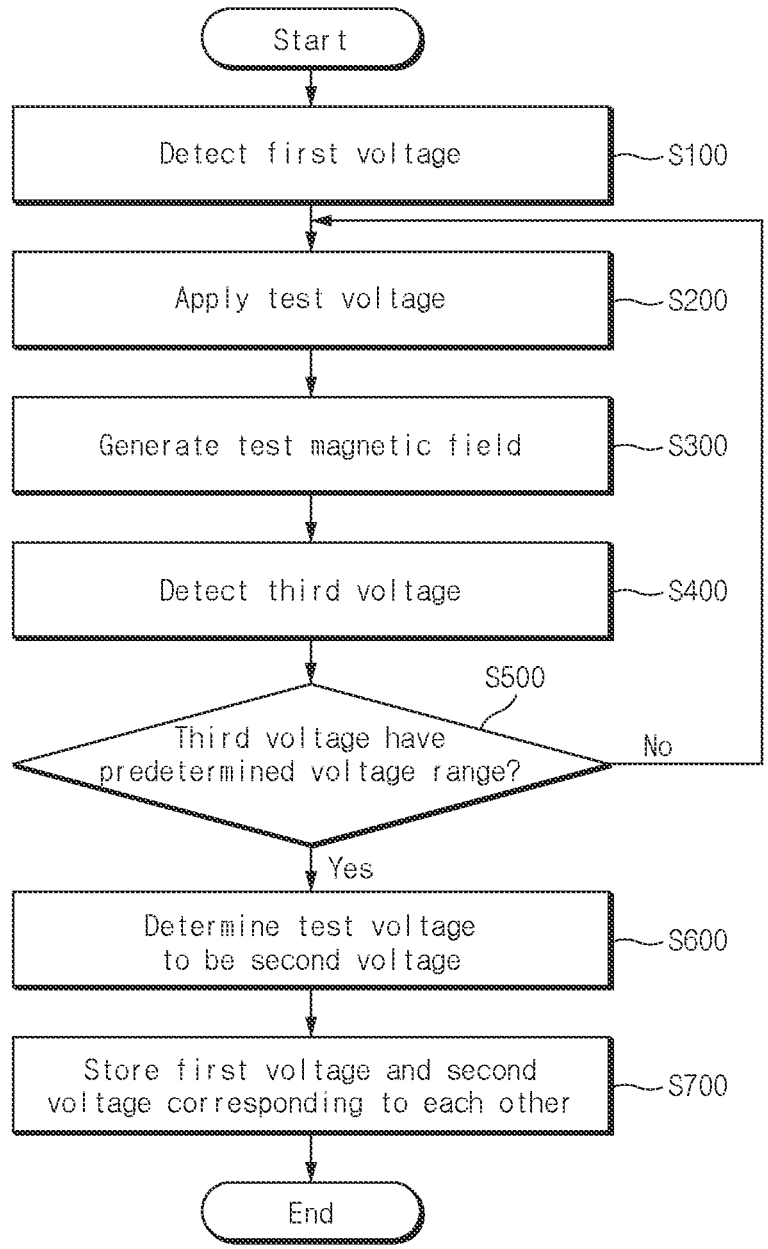
FIG. 7 is a flowchart illustrating an example of a method for operating a test mode of the image sensing device based on some implementations of the disclosed technology.

FIG. 7 is a flowchart illustrating an example of a method for operating a test mode of the image sensing device 100 based on some implementations of the disclosed technology.

During the test mode operation, the image sensing device 100 may detect the first voltage corresponding to the first magnetic field through the sensing circuit 210 (S100). The first magnetic field may be a magnetic field generated by the second substrate 500. The sensing circuit 210 may generate the first voltage corresponding to the first magnetic field provided in the direction perpendicular to the current generator 211 included in the sensing circuit 210. The sensing circuit 210 may transmit the generated first voltage to the shielding controller 300.

The shielding controller 300 may provide a test voltage to the offset circuit 220 (S200). In some implementations, the shielding controller 300 may determine a test voltage to be provided to the offset circuit 220 based on the first voltage. For example, the shielding controller 300 may determine a specific voltage that has the same magnitude as the first voltage and has a sign opposite to that of the first voltage, to be a test voltage.

The offset circuit 220 having received the test voltage may generate a test magnetic field corresponding to the test voltage (S300).

A test current corresponding to the test voltage may flow in the magnetic field generator 222 of the offset circuit 220. An induced magnetic field may be generated by the test current flowing in the magnetic field generator 222. Here, the induced magnetic field may refer to a test magnetic field.

The sensing circuit 210 may detect a third voltage corresponding to a third magnetic field formed after generation of the test magnetic field (S400).

As the test magnetic field is generated, a change in the first magnetic field may occur, and a change in the magnetic field provided to the sensing unit 210 may also occur. A magnetic field provided to the sensing circuit 210 after generation of the test magnetic field may be referred to as a third magnetic field, and a voltage detected in response to the third magnetic field may be referred to as a third voltage. The sensing circuit may transmit the detected third voltage to the shielding controller 300.

The shielding controller 300 may determine whether the received third voltage has a predetermined voltage range (S500).

When the first magnetic field is completely offset by the above-mentioned test magnetic field, the third voltage may reach zero volts (0V). In other words, as the predetermined voltage moves closer to zero volts (0V), the first magnetic field to be offset by the test magnetic field may increase.

If the received third voltage does not have the predetermined voltage range (denoted by 'No' in S500), the shielding controller 300 may again provide the test voltage to the offset circuit 220. In this case, the shielding controller 300 may determine the test voltage based on the received third voltage and the previously received first voltage.

For example, if the detected third voltage is greater than the previously received first voltage, this means that the first magnetic field is reinforced by the test magnetic field. In this case, the shielding controller 300 may change the sign of the test voltage.

In another example, if the detected third voltage is less than the first voltage and is greater than the predetermined voltage range, the shielding controller 300 may control the test voltage to be provided to the offset circuit 220 to be greater than a conventional test voltage.

If the received third voltage has the predetermined voltage range (denoted by 'Yes' in S500), the shielding controller 300 may determine the test voltage to be the second voltage (S600).

The shielding controller 300 may allow the determined second voltage to be stored in correspondence with the detected first voltage (S700). The shielding controller 300 may allow the first voltage for each shielding device 200 to be stored in correspondence with the second voltage, such that the first voltages of the respective shielding devices 200 and the second voltages corresponding to the first voltages can be stored in the shielding controller 300.

Figure 8:
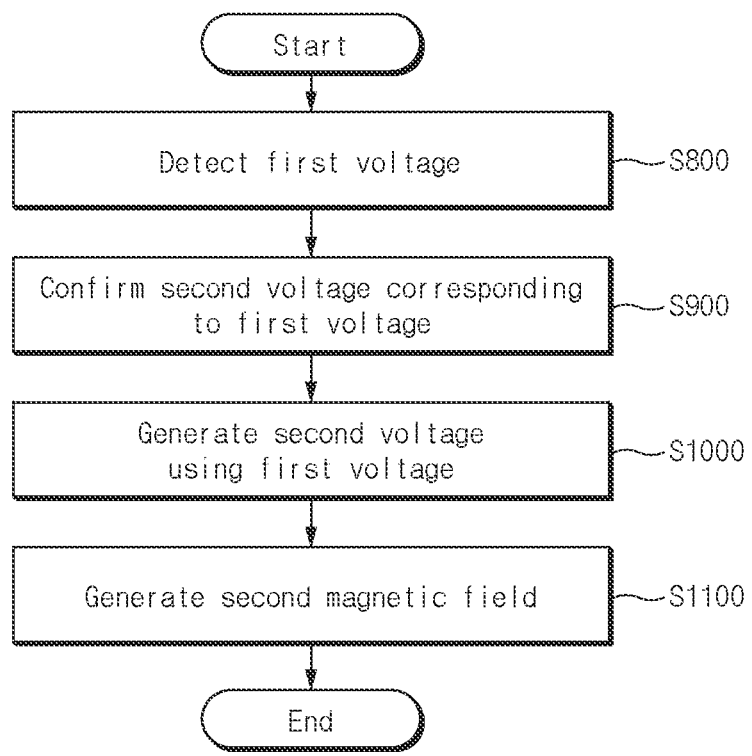
FIG. 8 is a flowchart illustrating an example of a method for offsetting a first magnetic field of the image sensing device based on some implementations of the disclosed technology.

FIG. 8 is a flowchart illustrating an example of a method for offsetting a first magnetic field of the image sensing device 100 based on some implementations of the disclosed technology.

Referring to FIG. 8, the sensing circuit 210 may detect a first voltage corresponding to a first magnetic field provided to the sensing circuit 210 (S800).

The sensing circuit 210 may detect the first voltage corresponding to the first magnetic field provided in the direction perpendicular to the sensing circuit 210. The sensing circuit 210 may transmit the detected first voltage to the offset circuit 220.

The offset circuit 220 may confirm a second voltage corresponding to the received first voltage (S900). The second voltage corresponding to the first voltage may be stored in the shielding controller 300 through the test mode operation.

The offset circuit 220 may generate the second voltage using the received first voltage (S1000). The offset circuit 220 may include the amplification circuit 221 for amplifying the first voltage, such that the amplification circuit 221 of the offset circuit 220 may amplify the first voltage to the second voltage.

The offset circuit 220 may generate a second magnetic field corresponding to the second voltage (S1100). The offset circuit 220 may include the magnetic field generator 222 provided with the conductor plate. As the second voltage is provided to the magnetic field generator 222, the second current may flow in the magnetic field generator 222. An induced magnetic field may be generated by the second current flowing in the magnetic field generator 222, and the induced magnetic field may be used as the second magnetic field.

As the first magnetic field is offset by the second magnetic field, noise generated in the first substrate 400 may decrease.

As is apparent from the above description, the image sensing device based on some implementations of the disclosed technology can offset a magnetic field generated in a substrate using the shielding device, such that the image sensing device can prevent noise from occurring in image data and can also prevent image quality from being deteriorated.

The embodiments of the disclosed technology may provide a variety of effects capable of being directly or indirectly recognized through the above-mentioned patent document.

Although a number of illustrative embodiments have been described, it should be understood that various modifications to the disclosed embodiments and other embodiments can be devised based on what is described and/or illustrated in this patent document.

What is claimed is:

1. An image sensing device comprising:
   a first substrate including a plurality of unit pixels to detect incident light to produce pixel signals carrying image information in the incident light;
   a second substrate positioned adjacent to the first substrate and including a structure that generates a first magnetic field at the first substrate affecting the plurality of unit pixels; and
   at least one shielding device disposed between the first substrate and the second substrate,
   wherein the shielding device includes:
      a sensing circuit to detect a first voltage corresponding to the first magnetic field; and
      an offset circuit to generate, based on the first voltage, a second magnetic field that counteracts the first magnetic field, and
      wherein the shielding device is arranged over a location of the second substrate, and wherein the location of the second substrate is determined based on a distance between the first substrate and the second substrate, a density of the first magnetic field per unit area, and where a logic circuit is located in the second substrate.

2. The image sensing device according to claim 1, wherein the sensing circuit includes:
   a current generator to generate a first current; and
   a voltage detector to detect the first voltage generated by the first current and the first magnetic field,
   wherein the first voltage includes a Hall effect voltage generated by the first magnetic field provided in a direction perpendicular to the first current.

3. The image sensing device according to claim 2, wherein a first current that flows in the current generator in parallel but opposite in direction to another first current that flows in another adjacent current generator located within a predetermined distance.

4. The image sensing device according to claim 1, wherein the offset circuit includes an amplification circuit to receive the first voltage from the sensing circuit and generate a second voltage by amplifying the first voltage.

5. The image sensing device according to claim 4, wherein the offset circuit includes a magnetic field generator that includes a conductor plate, wherein the second magnetic field is induced when the second voltage is provided to the magnetic field generator.

6. The image sensing device according to claim 1, further comprising a shielding controller to provide a test voltage to the offset circuit during a test mode operation for calculating a second voltage corresponding to the first voltage such that the second voltage is associated with the second magnetic field that counteracts the first magnetic field, wherein the offset circuit includes a magnetic field generator including a conductor plate for generating a test magnetic field using the test voltage provided to the magnetic field generator.

7. The image sensing device according to claim 6, wherein:
   the sensing circuit detects a third voltage corresponding to a third magnetic field formed after generation of the test magnetic field; and
   the shielding controller sets the test voltage as the second voltage in a case that the third voltage has a predetermined voltage range and map the first voltage to the second voltage to store mapping information between the first voltage and the second voltage.

8. The image sensing device according to claim 7, wherein:
   during a normal mode operation for offsetting the first magnetic field,
   the sensing circuit transmits the first voltage to the offset circuit; and
   the offset circuit includes:
      an amplification circuit, upon receiving the first voltage, amplifying the first voltage to the second voltage based on mapping information between the first voltage and the second voltage stored in the shielding controller; and
      a magnetic field generator including a conductor plate, wherein the second magnetic field is induced when the second voltage is provided to the magnetic field generator.

9. An image sensing device comprising:
   a first substrate including electric circuits that generate electrons in the first substrate;
   a second substrate arranged adjacent to the first substrate and including a structure that generates a first magnetic field for providing a magnetic force to the electrons;
   a shielding device disposed between the first substrate and the second substrate to detect the first magnetic field and generate, based on the detected first magnetic field, a second magnetic field for counteracting the first magnetic field; and
   a shielding controller to provide a test voltage to the shielding device during a test mode operation for calculating a second voltage corresponding to the first magnetic field such that the second voltage is associated with the second magnetic field that counteracts the first magnetic field,
   wherein the shielding device generates a test magnetic field corresponding to the test voltage.

10. The image sensing device according to claim 9, wherein the second magnetic field is identical in magnitude to the first magnetic field and is opposite in phase to the first magnetic field.

11. The image sensing device according to claim 10, wherein the shielding device:
- detects a first voltage in response to the first magnetic field applied at a predetermined angle with respect to the shielding device; and
- amplifies the first voltage to generate a second voltage for generating the second magnetic field.

12. The image sensing device according to claim 11, wherein:
- the shielding device includes a magnetic field generation region to receive the second voltage; and
- the second magnetic field is induced by the second voltage.

13. The image sensing device according to claim 10, wherein:
- the shielding device detects a third magnetic field formed after generation of the test magnetic field; and
- the shielding controller sets the test voltage as the second voltage in a case that the third magnetic field reaches a predetermined value, and map the first magnetic field to the second voltage to store mapping information between the first magnetic field and the second voltage.

14. The image sensing device according to claim 13, wherein, during a normal mode operation for offsetting the first magnetic field, the shielding device detects the first magnetic field and generate the second magnetic field based on the second voltage corresponding to the first magnetic field.

* * * * *